US006753361B2

(12) United States Patent
Kroner et al.

(10) Patent No.: US 6,753,361 B2
(45) Date of Patent: Jun. 22, 2004

(54) COMPOSITIONS FOR PRODUCING MOLDINGS FROM FINELY DIVIDED MATERIALS

(75) Inventors: Matthias Kroner, Eisenberg (DE); Matthias Gerst, Neustadt (DE); Bernd Reck, Gruenstadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/044,948

(22) Filed: Jan. 15, 2002

(65) Prior Publication Data

US 2002/0130439 A1 Sep. 19, 2002

(30) Foreign Application Priority Data

Jan. 17, 2001 (DE) .......................................... 101 01 944

(51) Int. Cl.$^7$ .............................. C08J 5/10; C08L 97/02
(52) U.S. Cl. .............................. 524/14; 524/9; 524/13; 524/15; 524/16; 524/35
(58) Field of Search ............................. 524/35, 9, 13, 524/14, 15, 16

(56) References Cited

U.S. PATENT DOCUMENTS

| 4,076,917 A | 2/1978 | Swift et al. |
| 4,612,224 A | 9/1986 | Davis |
| 5,548,036 A | 8/1996 | Kroner et al. |
| 5,661,213 A | 8/1997 | Arkens et al. |
| 5,925,728 A | 7/1999 | Kim et al. |

FOREIGN PATENT DOCUMENTS

| CA | 2037214 | 9/1991 |
| EP | 445 578 | 9/1991 |
| EP | 583 086 | 2/1994 |
| WO | WO 94/15993 | 7/1994 |
| WO | WO 94/20661 | 9/1994 |
| WO | WO 95/02007 | 1/1995 |
| WO | WO 99/02591 | 1/1999 |
| WO | WO 99/09100 | 2/1999 |

*Primary Examiner*—James J. Seldisck
*Assistant Examiner*—U. K. Rajguru
(74) *Attorney, Agent, or Firm*—Oblon, Spivak, McClelland, Maier & Neustadt, P.C.

(57) ABSTRACT

The present invention relates to the use of compositions comprising reaction products of low molecular mass dicarboxylic or tricarboxylic acids with ammonia to produce moldings comprising finely divided materials.

12 Claims, No Drawings

COMPOSITIONS FOR PRODUCING MOLDINGS FROM FINELY DIVIDED MATERIALS

The present invention relates to the use of compositions which comprise reaction products of low molecular mass dicarboxylic or tricarboxylic acids with ammonia to produce moldings from finely divided materials.

The production of moldings from finely divided materials, such as fiberboard or chipboard panels, etc., and the production of sheetlike structures from fiber materials, examples being fiber webs and fiber mats, is frequently carried out using a polymeric binder. To increase the strength, especially the wet strength and thermal stability, it is common to use binders which comprise crosslinkers that give off formaldehyde. Binders based on phenol-formaldehyde resins are known, for example, from U.S. Pat. No. 4,612,224. WO 94/20661 describes crosslinkable dispersion powders and their use as binders for fibers, comprising N-methylolamide groups as crosslinking components. On crosslinking, these groups give off formaldehyde.

Emissions of formaldehyde as a result of the binder are, however, problematic not least for reasons of occupational hygiene. Numerous alternatives have already been proposed in order to avoid formaldehyde emissions. For instance, U.S. Pat. No. 4,076,917 discloses binders which comprise carboxylic acid or carboxylic anhydride polymers and β-hydroxyalkylamides as crosslinkers. A disadvantage is the complicated preparation of the β-hydroxyalkylamides. Similar binders are known from EP-A 583 086.

EP-A 445 578 discloses boards made from finely divided materials such as glass fibers, whose binder comprises a composition comprising high molecular mass polycarboxylic acids and polyhydric alcohols, alkanolamines and/or polyfunctional amines. The water resistance of the boards obtained, is not satisfactory.

WO 99/09100 describes the use of heat-curable aqueous compositions which comprise a polymer having a low acid-group fraction, a polymer rich in acid groups, and at least one alkanolamine having two hydroxyl groups as binders for moldings from finely divided materials.

WO 99/02591 describes heat-curable compositions comprising a surface-active amine and a polymer with a low acid group fraction, prepared in the presence of a carboxyl-rich polymer, and their use as binders for moldings from finely divided materials.

The formaldehyde-free binder systems of the prior art are generally polymer systems. These systems generally have a high processing viscosity, which in connection with the production of moldings from finely divided materials often hinders uniform incorporation of the binders into the substrate to be bound and, in the course of the shaping operation, leads to inhomogeneities and thus to a relatively low mechanical strength in the molding. Moreover, these binder systems are comparatively costly, since the polymer component generally requires an additional preparation step.

WO 94/15993 discloses the preparation of polymers of aspartic acid by thermal condensation of monoamides of fumaric acid or maleic acid or of ammonium salts of the monoamides of these acids. From WO 95/02007 it is known that the monoamides required to prepare the aspartic acid polymers, and their ammonium salts, may be prepared in situ by reacting the acid anhydrides with a component that supplies ammonia.

It is an object of the present invention to provide a binder system for finely divided materials which on processing does not lead to formaldehyde emissions, which is favorably priced and with which moldings or consolidated sheetlike structures may be produced from fiber materials.

We have found that this object is achieved, surprisingly, by compositions which comprise a reaction product of a dicarboxylic or tricarboxylic acid or the anhydride thereof with ammonia and, if desired, a primary amine and/or a compound containing at least two hydroxyl groups, and/or, as a precursor of said reaction product, a mixture of said dicarboxylic or tricarboxylic acids or its anhydride with a substance which releases ammonia on heating.

The present invention accordingly provides a method for producing moldings from finely divided materials and for sheetlike structures of fiber materials, wherein the finely divided material is mixed or impregnated with a heat-curable composition and the resultant mixture is shaped at temperatures above 120° C. or an unconsolidated sheet-like structure of fiber materials is first treated with a heat-curable composition and then heated at temperatures above 120° C., wherein the heat-curable composition comprises:

at least one reaction product of
i. at least one polycarboxylic acid of the formula I:

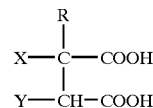

(I)

in which
R is hydrogen or a $CH_2COOH$ group,
X is OH or $NH_2$ if Y is hydrogen,
Y is OH or $NH_2$ if X is hydrogen, or
X and Y together are a π bond, and/or an anhydride of the polycarboxylic acid I
ii. with ammonia and, if desired
iii. with primary amines and/or compounds containing at least two hydroxyl groups; and/or
a mixture of at least one polycarboxylic acid of the formula I and/or its anhydride and at least one substance which releases ammonia on heating and, if desired, primary amines and/or compounds containing at least two hydroxyl groups.

The invention further provides the sheetlike structures and moldings obtainable by these processes. The invention additionally provides heat-curable compositions which besides the aforementioned constituents comprise at least one further constituent selected from finely divided film forming polymers of ethylenically unsaturated monomers, compounds containing at least two hydroxyl groups, and water-soluble homopolymers and copolymers of acrylic acid and/or methacrylic acid.

In principle and in accordance with the invention, all conceivable reaction products of the polycarboxylic acid I or its anhydride with ammonia are suitable. These reaction products include the monoamides, bisamides and trisamides of the polycarboxylic acids I in which one (monoamides), two or all the carboxyl groups have been converted into carboxamide groups. They also include the monoammonium, bisammonium and trisammonium salts of the polycarboxylic acids I and also the monoammonium and bisammonium salts of monoamides and bisamides of I. Suitable polycarboxylic acids I are the unsaturated dicarboxylic and tricarboxylic acids: maleic acid, fumaric acid and aconitic acid; the hydroxyl-bearing dicarboxylic and tricarboxylic acids: malic acid and citric acid; and the amino-bearing dicarboxylic acid: aspartic acid. Suitable anhydrides are the intramolecular anhydrides of I, an example being maleic anhydride.

Without wishing to restrict the invention by one theory, it is assumed that, on heating, the compositions defined above condense to oligomers or polymers containing amide groups and/or cyclic imide groups in accordance with the schemes shown in EP-B 677 080 on pages 4 and 5. Said latter groups are probably responsible for the strength of the moldings and sheetlike structures. It is supposed that heating is accompanied first by polymerization of the monoamides of the ethylenically unsaturated polycarboxylic acids Ia (monoamide of the polycarboxylic acids I in which X and Y together are a π bond), in which the nitrogen of the amide group undergoes addition onto the ethylenically unsaturated double bond of Ia. The oligomer which is initially formed in this case, containing amide structural units II, reacts on prolonged exposure to heat and/or an increase in temperature, with intramolecular condensation, to form a polymer containing cyclic imide groups III. The intramolecular condensation generally begins at temperatures above 120° C., preferably above 130° C., and takes place to an increased extent at temperatures above 140° C., in particular above 150° C., and with particular preference above 160° C. In scheme 1, the reaction is illustrated on the example of the reaction of an ethylenically unsaturated dicarboxylic monoamide Ia.

Scheme 1:

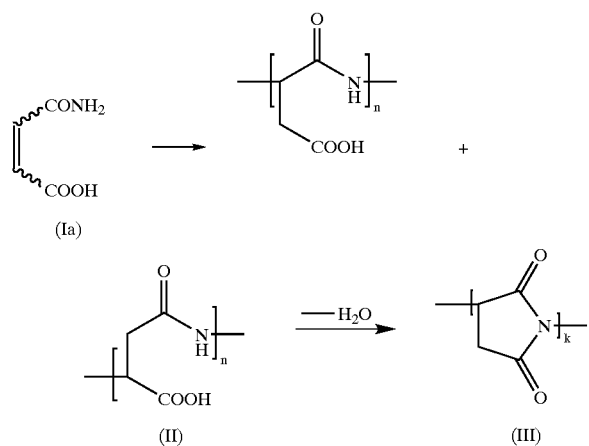

The ammonium salts of the monoamides also polymerize in a similar way, as shown in Scheme 2 using the example of the ammonium salt of the monoamide Ia'. In Scheme 1 and Scheme 2, the variables n and k represent the number of repeating units in the oligomer, and in the case of the oligomers containing structural units of the formulae II' and/or III" are situated preferably in a range from 2 to 100.

Schema 2:

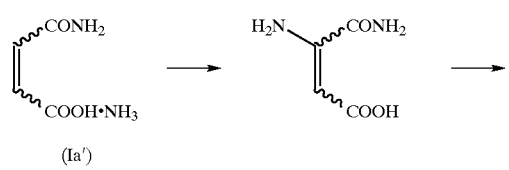

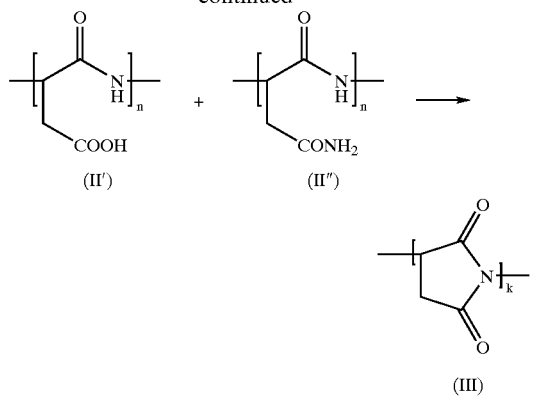

Polymers composed substantially of cyclic imide substructures (cf. formula III) probably form the actual binder; depending on the intended application, suitable polymers also include those which are composed predominantly of structural units of formula II and/or II' and/or II", and/or whose polymer chains are crosslinked by way of these acid and/or amide groups.

Also suitable, besides the monoamides and amides of ethylenically unsaturated polycarboxylic acids Ia, are precursors of these (mono)amides from which the monoamides of the ethylenically unsaturated polycarboxylic acids Ia are released by elimination of ammonia or water, examples being the diammonium salts of the unsaturated polycarboxylic acids I or the monoamides and also the (di)ammonium salts of polycarboxylic acids I where X or Y=OH or NH$_2$.

Also suitable, accordingly, are mixtures of the aforementioned polycarboxylic acids I, preferably their anhydrides, with substances which release ammonia on heating, since the polycarboxylic acids I react with ammonia to form the monoamides and their ammonium salts.

Preference is given in accordance with the invention to the monoamides and diamides of fumaric acid and of maleic acid, to the monoammonium and diammonium salts of fumaric acid and of maleic acid, and to the monoamide ammonium salts of maleic acid and fumaric acid. Preference is also given in accordance with the invention to mixtures of fumaric acid and/or maleic acid with substances which give off ammonia on heating.

The amides, monoamides and ammonium salts of the polycarboxylic acids I are known in principle to the skilled worker and in some cases are available commercially, or may be prepared in analogy to prior art processes, as disclosed for example in U.S. Pat. No. 5,292,858, Liebigs Ann. Chem. 259, p.138, JP-A 74/35325, DE-A 4300020 or DE-A 4427631, by reacting I, preferably the anhydride I, with ammonia; in accordance with the stoichiometry of this reaction, it is common to choose a molar ratio of ammonia to polycarboxylic acid of at least 1:1, in particular from 1:1 to 2:1 in the case of dicarboxylic acids I and from 1:1 to 3:1 in the case of tricarboxylic acids.

The monoamides of I and their ammonium salts are preferably prepared by reacting the polycarboxylic acids I or, preferably, the anhydrides of the polycarboxylic acids I with ammonia in a solvent, especially an aliphatic ketone such as acetone, ethyl methyl ketone, diethyl ketone, cyclopentanone or cyclohexanone, or in mixtures of these ketones with one another or with water, in accordance with instructions of DE-A 4427631, or by exposing the solid or melted polycarboxylic acid I or its anhydride to gaseous ammonia in accordance with the technical teaching of DE-A 4300020.

The disclosure of content of the two documents is hereby incorporated by reference.

For the purposes of the invention, heat-curable binders include the above-described water-soluble oligomers, which are generally obtainable by heating a monoamide or diamide, a monoammonium or diammonium salt or a monoamide ammonium salt of a polycarboxylic acid of formula I, preferably a monoamide, in the presence or absence of a primary amine and/or of a compound containing at least two OH groups. The requisite temperature for the preparation of these oligomers will generally not exceed 160° C., since above 160° C. there is increased formation of polymers containing cyclic imide structures, which are no longer soluble in water. Preferably, such oligomers may be prepared at temperatures in the range from 120 to 160° C. These oligomers generally have from 2 to 120 repeating units of the formula IIa and/or IIb.

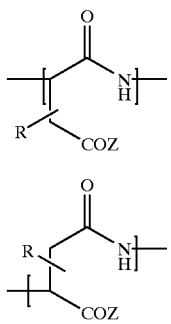

in which R is as defined above and in particular is hydrogen and z is selected from OH, OH.NH$_3$ and NH$_2$. Such oligomers generally have a number-average degree of oligomerization in the range from 2 to 120, preferably from 3 to 100, which corresponds to a number-average molecular weight in the range from 250 to 15 000, preferably from 350 to 11 000, and a weight-average molecular weight in the range from 500 to 100 000, preferably from 600 to 20 000.

Where the heat-curable binder used comprises a mixture of at least one polycarboxylic acid of the formula I (and/or the anhydride of I) and at least one substance which releases ammonia on heating, such a mixture is generally used in a proportion such that the molar ratio of released ammonia to the polycarboxylic acid I is at least 0.9:1, and not more than 3:1, in particular from 1:1 to 2:1.

Substances which give off ammonia on heating are likewise known to the skilled worker, from WO 95/02007, for example, whose disclosure content is incorporated by reference. The substances which give off ammonia on heating include acid derivatives of ammonia containing ammonia in saltlike or covalently bonded form, and also absorbents loaded with ammonia. Acid derivatives of ammonia are the acid addition salts with mineral acids, such as ammonium chloride, ammonium sulfate, diammonium hydrogen phosphate, acid addition salts with weak acids, such as ammonium acetate, ammonium formate, ammonium oxalate, and especially the ammonia derivatives of carbonic acid, such as ammonium hydrogen carbonate, ammonium carbonate, and ammonium carbamate. Acid derivatives of ammonia are also the following carbonic acid derivatives which contain ammonia in covalently bonded form, such as urea, N-alkylurea, alkylcarbamates, alkali metal and alkaline earth metal carbamates, ammonium carbamate, cyanic acid, cyanuric acid, ammonium cyanate, biuret, acetylurea, guanidine, guanidinium nitrate, guanidinium hydrogen carbonate, semicarbazide, cyanamide, calcium cyanamide, dicyandiamide, biguanide, nitroguanidine, aminoguanidine, allophanates, melamine, amidineurea, cyanourea, and thiourea. Examples of suitable ammonia-laden absorbents are active carbon, aluminum oxide, silica gel, acidic ion exchangers, the chlorides of calcium, cobalt, and zinc, kieselguhr, silica, waterglass, iron hydroxide, aluminum hydroxide, alumina, titanium dioxide, iron oxide, zeolite, and bentonite. Further suitable compounds which give off ammonia on heating include those such as urotropine, formamide and acetamide. Preferred substances are ammonium hydrogen carbonate, ammonium carbonate, and ammonium carbamate.

Ammonia-laden absorbents are obtained by passing ammonia over appropriate absorbents. Suitable examples include active carbon, zeolite, aluminum hydroxide, aluminum oxide, silica gel, kieselguhr, silica, waterglass gel, ammonium nitrate as Divers' liquid, acidic ion exchangers, chlorides of calcium, zinc, and cobalt, and also iron hydroxide, iron oxide, aluminas and titanium dioxide.

The compositions of the present invention may be used as a powder or as a solution, preferably as an aqueous solution. The form of formulation is guided primarily by the intended application. To consolidate fiber structures, for example, the compositions of the invention are used preferably as solutions, especially as aqueous solutions. In the production of moldings from finely divided materials, they can be used both as powders and in the form of solutions.

For application as powders, suitable compositions of the invention include in particular the amides and the monoamides of polycarboxylic acids I, and also mixtures of polycarboxylic acids and substances which release ammonia. For use in solution, preferably in aqueous solutions, preference is given to the ammonium salts of the polycarboxylic acids I and their monoamides, and also to the water-soluble oligomers containing repeating units of the formulae IIa and IIb, preferably their ammonium salts (Z=OH.NH$_3$).

In the preparation of the reaction products of the polycarboxylic acid I with ammonia it is also possible for a primary amine, i.e., a compound containing at least one NH$_2$ group, to be present. The compositions of the invention may also include a primary amine. In general, however, the molar fraction of the primary amine will not exceed 30 mol %, based on the polycarboxylic acid I. Examples of primary amines are methylamine, ethylamine, n-propylamine, isopropylamine, n-butylamine, n-hexylamine, aminoethanol, aminopropanol, cyclohexylamine, ethylenediamine, diethylenediamine, and comparable compounds. Preferred embodiments of the compositions of the invention contain no primary amines or their reaction products with polycarboxylic acids I.

Besides the aforementioned reaction products of polycarboxylic acids with ammonia, the compositions according to the invention may also comprise a compound containing two or more hydroxyl groups and/or reaction products thereof with polycarboxylic acids I.

Suitable compounds containing two or more hydroxyl groups, other than aliphatic or cycloaliphatic polyols having 2 or more hydroxyl groups, e.g., 2, 3, 4 or 5 hydroxyl groups, include in particular amines and amides containing at least two, e.g., 2, 3, 4, 5 or 6, hydroxy-C$_2$–C$_4$ alkyl groups. The compounds containing at least two hydroxyl groups may be present in the compositions of the invention customarily in an amount of up to 50% by weight, preferably up to 30% by weight, e.g., from 1 to 50% by weight, preferably from 3 to 30% by weight, based on the reaction product of ammonia and polycarboxylic acid (or on the equivalent amount of carboxylic acid and ammonia-releasing substance).

Examples of aliphatic and cycloaliphatic diols or polyols are ethylene glycol, propylene glycol, butanediol, hexanediol, diethylene glycol, triethylene glycol, dipropylene glycol, tripropylene glycol, trimethylolpropane, pentaerythritol and dipentaerythritol and also their alkoxylated derivatives, and also polyethylene oxide derivatives and polypropylene oxide derivatives, and especially alkanol amines of the formula IV

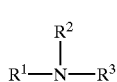
(IV)

where $R^1$ is a hydrogen atom, a $C_1-C_{20}$ alkyl group, a $C_2-C_4$ hydroxyalkyl group or a radical of the formula V

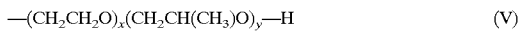
(V)

in which the sequence of the alkylene oxide units is arbitrary and x and y are independently of one another are an integer from 0 to 100, the sum of x and y being >1, and $R^2$ and $R^3$ independently of one another are a $C_2-C_4$ hydroxyalkyl group.

With particular preference, $R^2$ and $R^3$ independently are a 2-hydroxyethyl group, a 2- or 3-hydroxypropyl group or a 2-, 3- or 4-hydroxybutyl group, and $R^1$ is a hydrogen atom, a $C_1-C_6$ alkyl group, especially methyl, ethyl, n- or isopropyl, or a $C_2-C_4$ hydroxyalkyl group.

Particularly preferred compounds IV are diethanolamine, triethanolamine, diisopropanolamine, tripropanolamine, methyldiethanolamine, butyldiethanolamine and methyldiisopropanolamine, especially triethanolamine, and the alkoxylates thereof.

Further suitable amines containing at least 2 hydroxyalkyl groups are the amines disclosed in DE 196 21 573 as component A, hereby incorporated by reference. These compounds comprise linear or ranched aliphatic compounds containing per molecule at least two functional amino groups of type (a) and/or (b)

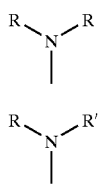

(a)

(b)

where R is $C_2-C_4$ hydroxyalkyl and R' is $C_1-C_{20}$ alkyl. Preferably, the compound in question is of the formula VI

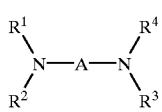
(VI)

where
A is $C_2-C_{18}$ alkylene unsubstituted or substituted by one or more groups selected independently from $C_1-C_4$ alkyl, $C_2-C_4$ hydroxyalkyl, $C_3-C_7$ cycloalkyl, OH and $NR^6R^7$, where $R^6$ and $R^7$ independently are H, $C_2-C_4$ hydroxyalkyl or $C_1-C_4$ alkyl, and uninterrupted or interrupted by one or more oxygen atoms and/or $NR^5$ groups, where $R^5$ is H, hydroxyalkyl, $(CH_2)_nNR^6R^7$, where n is from 2 to 5 and $R^6$ and $R^7$ are as defined above, or alkyl which may in turn be interrupted by one or more $NR^5$ groups, $R^5$ being as defined above, and/or substituted by one or more $NR^6R^7$ groups, where $R^6$ and $R^7$ are as defined above;

or A is a radical of the formula

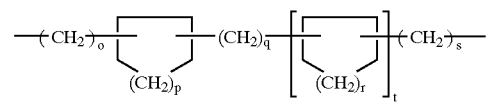

where
o, q and s independently are 0 or an integer from 1 to 6, p and r independently are 1 or 2, and t is 0, 1 or 2, it being possible, further, for the cycloaliphatic radicals to be substituted by 1, 2 or 3 $C_1-C_4$ alkyl radicals, and $R^1$, $R^2$ and $R^3$ and $R^4$ independently are H, $C_2-C_4$ hydroxyalkyl, $C_1-C_4$ alkyl or $C_3-C_7$ cycloalkyl.

The compounds containing at least 2 hydroxyl groups also include the β-hydroxyalkylamides of the formula

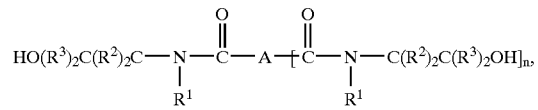

specified in U.S. Pat. No. 5,143,582, where $R^1$ is hydrogen, a short-chain alkyl group or $HO(R^3)_2C(R^2)_2C—$, n is 1, 2, 3 or 4, preferably 1, —A— is an n+1-valent, preferably divalent organic radical, in particular a —$(CH_2)_m$— group, where m is an integer from 0 to 8, preferably from 2 to 8, $R^2$ and $R^3$ independently are hydrogen or $C_1-C_5$ alkyl, preferably all groups $R^2$ and $R^3$ being hydrogen, or one of the $R^2/R^3$ groups being $C_1-C_5$ alkyl and the remaining $R^2/R^3$ groups being hydrogen. Particular preference is given to bis[N,N-di(2-hydroxyethyl)]adipamide.

Furthermore, the compositions of the invention may also comprise a finely divided filmforming polymer, in the form for example of an aqueous dispersion or of a polymer powder. The finely divided polymer is generally a free-radical emulsion polymer or a powder prepared therefrom.

In the compositions of the invention, the finely divided polymer may be present customarily in an amount of up to 500% by weight, e.g., from 5 to 500% by weight, based on the reaction product of ammonia and polycarboxylic acid and/or anhydride (or on the equivalent amount of carboxylic acid and/or anhydride and ammonia-releasing substance).

In general, the finely divided polymer is synthesized from
from 80 to 100% by weight, preferably from 85 to 99.9% by weight, based on the total weight of the monomers which form the polymer, of at least one ethylenically unsaturated principal monomers, and from 0 to 20% by weight, preferably from 0.1 to 15% by weight, based on the total weight of the monomers which form the polymer, of at least one ethylenically unsaturated comonomer.

The principal monomer generally comprises a monoethylenically unsaturated monomer or conjugated diolefins of limited solubility in water, said solubility being generally less than 80 g/l, preferably less than 50 g/l, e.g., in the range from 0.1 to 50 g/l (at 25° C. and 1 bar).

Examples of principal monomers are:
esters of preferably $C_3$ to $C_6$ α,β-monoethylenically unsaturated monocarboxylic or dicarboxylic acids, e.g., esters of acrylic acid, methacrylic acid, maleic acid, fumaric acid and itaconic acid with $C_1$–$C_{12}$, preferably $C_1$–$C_8$ alkanols. Examples of such esters are, in particular, methyl, ethyl, n-butyl, isobutyl, tert-butyl, n-pentyl, isopentyl and 2-ethylhexyl acrylate and the corresponding methacrylates;

vinylaromatic compounds such as styrene, α-methylstyrene, o-chlorostyrene, vinyltoluenes and mixtures thereof;

vinyl esters of $C_1$–$C_{18}$ monocarboxylic or dicarboxylic acids, such as vinyl acetate, vinyl propionate, vinyl n-butyrate, vinyl laurate and/or vinyl stearate;

conjugated dienes such as butadiene;

linear or branched-chain 1-olefins or cyclic olefins, e.g., ethene, propene, butene, isobutene, pentene, cyclopentene, hexene or cyclohexene;

acrylonitrile, methacrylonitrile: owing to the heightened solubility of the nitriles in water, the fraction among the principal monomers will generally not exceed 30% by weight, based on the total monomer amount. Where desired, the nitriles generally account for from 1 to 30, preferably from 2 to 25, and in particular from 5 to 20% by weight of the total monomer amount.

vinyl and allyl alkyl ethers having from 1 to 20, preferably from 2 to 10 carbon atoms in the alkyl radical, it being possible for said alkyl radical to carry further substituents, such as one or more hydroxyl groups, one or more amino or diamino groups or one or more alkoxylate groups, such as, for example, methyl vinyl ether, ethyl vinyl ether, propyl vinyl ether and 2-ethylhexyl vinyl ether, isobutyl vinyl ether, vinyl cyclohexyl ether, vinyl 4-hydroxybutyl ether, decyl vinyl ether, dodecyl vinyl ether, octadecyl vinyl ether, 2-(diethylamino)ethyl vinyl ether, 2-(di-n-butylamino) ethyl vinyl ether, methyl diglycol vinyl ether, and the corresponding allyl ethers, and mixtures thereof.

Particularly preferred principal monomers are vinylaromatic monomers, especially styrene, and also esters of acrylic acid and esters of methacrylic acid with $C_1$–$C_8$ alkanols, especially methyl methacrylate, n-butylmethacrylate, n-butyl acrylate, tert-butyl acrylate, ethyl acrylate, 2-ethylhexyl acrylate, and also vinyl acetate, vinyl propionate, ethene and butadiene.

Examples of suitable comonomers are:

monoethylically unsaturated $C_3$–$C_8$ monocarboxylic or dicarboxylic acids or their anhydrides, preferably acrylic acid, methacrylic acid, methacrylic anhydride, maleic acid, maleic anhydride, fumaric acid and/or itaconic acid;

amides and N-alkyl amides of the aforementioned ethylenically unsaturated carboxylic acids, such as acrylamide, methacrylamide, N,N-dimethylacrylamide, N-tert-butylacrylamide, N-methylmethacrylamide, N-alkylolamides, especially N-hydroxymethyl- and N-hydroxyethylamides of monoethylenically unsaturated monocarboxylic acids, such as N-methylolacrylamide and -methacrylamide.

sulfo monomers, such as allylsulfonic acid, methallylsulfonic acid, styrenesulfonic acid, vinylsulfonic acid, 2-acrylamido-2-methylpropanesulfonic acid, allyloxybenzenesulfonic acid, their corresponding alkali metal or ammonium salts, and/or mixtures thereof, and also sulfopropyl acrylate and/or sulfopropyl methacrylate;

$C_1$–$C_4$ hydroxyalkyl esters of $C_3$–$C_8$ monocarboxylic or dicarboxylic acids, especially of acrylic acid, methacrylic acid or maleic acid, or their derivatives alkoxylated with from 2 to 50 mol of ethylene oxide, propylene oxide, butylene oxide or mixtures thereof, or esters of $C_1$–$C_{18}$ alcohols, alkoxylated with from 2 to 50 mol of ethylene oxide, propylene oxide, butylene oxide or mixtures thereof, with the aforementioned acids, such as hydroxyethyl acrylate, hydroxyethyl methacrylate, hydroxypropyl acrylate, hydroxypropyl methacrylate, 1,4-butanediol monoacrylate, ethyl diglycol acrylate, methyl polyglycol acrylate (11 EO), (meth)acrylic esters of $C_{13}$/$C_{15}$ oxo alcohol reacted with 3, 5, 7, 10 or 30 mol of ethylene oxide, and/or mixtures thereof;

ethylenically unsaturated phosphoric and phosphonic acids, e.g., vinylphosphonic acid and salts thereof, dimethyl vinylphosphonate, acryloxyethyl phosphate, acryloxyethyl phosphonate, 2-acrylamido-2-methylphosphonate and the like;

alkylaminoalkyl (meth)acrylates or alkylaminoalkyl (meth)acrylamides or quaternization products thereof, such as 2-(N,N-dimethylamino)ethyl (meth)acrylate or 2-(N,N,N-trimethylammonium)ethyl methacrylate chloride, 3-(N,N-dimethylamino)propyl (meth) acrylate, 2-dimethylaminoethyl(meth)acrylamide, 3-dimethylaminopropyl(meth)acrylamide, 3-trimethylammoniumpropyl(meth)acrylamide chloride, and mixtures thereof;

allyl esters of $C_1$–$C_{30}$ monocarboxylic acids;

N-vinyl compounds, such as N-vinylformamide, N-vinyl-N-methylformamide, N-vinylpyrrolidone, N-vinylimidazole, 1-vinyl-2-methylimidazole, 1-vinyl-2-methylimidazoline, 2-vinylpyridine, 4-vinylpyridine, N-vinylcarbazole and/or N-vinylcaprolactam;

diallyldimethylammonium chloride, vinylidene chloride, vinyl chloride, acrolein, methacrolein;

monomers containing keto groups, such as acetoacetoxyethyl (meth)acrylate or diacetoneacrylamide, monomers containing urea groups, such as ureidoethyl (meth)acrylate, (N-(2-methacryloxy ethyl)imidazoline-2-one);

monomers containing silyl groups, such as trimethoxysilylpropyl methacrylate;

monomers containing glycidyl groups, such as glycidyl methacrylate;

monomers containing at least 2 ethylenically unsaturated double bonds, such as allyl acrylate, butandiol diacrylate, hexanediol diacrylate, diethyleneglycol diacrylate, triethyleneglycol diacrylate, trimethylolpropane triacrylate, the corresponding methacrylates, divinyl benzene, diallyl phthalate, butanediol diallyl ether, hexanediol diallyl ether, etc. These monomers may account for up to 5% by weight, e.g. from 0.1 to 5% by weight, of the monomers forming the finely divided polymer. In a preferred embodiment, these monomers do not account for more than 0.1% by weight of the monomers forming the polymer. Especially, the polymer does not contain polymerized any of these monomers (i.e. less than 0.01% by weight).

Preferably the copolymers include at least one of the aforementioned monoethylenically unsaturated carboxylic acids, especially one of the monocarboxylic acids, which have been copolymerized preferably in an amount of up to 10% by weight, e.g., from 0.1 to 10% by weight. Further preferred comonomers are the amides of monoethylenically unsaturated monocarboxylic acids, e.g., acrylamide or methacrylamide. Where desired, these generally make account for up to 10% by weight, e.g., from 0.1 to 10% by weight, in particular from 0.1 to 5% by weight, of the total monomer amount.

By finely divided polymers are meant those whose particles have a weight-average diameter of <100 μm. Where the polymers are used in the form of an aqueous dispersion, the weight-average polymer particle diameter $d_{50}$ will not exceed a figure of 5 μm and in particular will not exceed a figure of 2 μm. In particular, the weight-average diameter $d_{50}$ of the polymer particles is in the range from 100 to 2 000 nm. By the weight-average particle diameter $d_{50}$ is meant the diameter below which 50% by weight of the polymer particles fall. The weight-average particle diameter of a polymer may be determined in a known manner on an aqueous dispersion of the particles by means of quasielastic light scattering or by measurement in an ultracentrifuge. The particles of the powders prepared from the dispersions will of course have larger particle diameters, since the powder particles generally comprise a large number of agglomerated primary particles. Typical powder diameters are generally in the range from 2 to 100 μm.

The monomer composition is generally chosen so as to give for the polymer A1 a glass transition temperature Tg in the range from −60° C. to +150° C.

The finely divided polymers are generally prepared by free-radical emulsion polymerization in the presence of surface-active compounds customary for this purpose, and in accordance with known methods (see, for example, Distler, Wässrige Polymerdispersionen [Aqueous polymer dispersions], Wiley VCH, Weinheim 1999; H. Warson, Synthetic Resin Emulsions, Ernest Benn Ltd., London 1972, pp. 193–242). The skilled worker is likewise familiar with the preparation of the polymer powders from these dispersions, which is generally done by spray-drying the aqueous monomer dispersions, preferably in the presence of spraying aids customary for the purpose, such as polyvinyl alcohol, polyacrylic acids, phenolsulfonic acid- and naphthalenesulfonic acid-formaldehyde condensation products. Both aqueous polymer dispersions and the powders prepared from them are, moreover, available commercially, for example, under the ACRONAL®, STYRONAL®, BUTOFAN® and STYROFAN® brand names of BASF Aktiengesellschaft, Ludwigshafen, Germany.

Suitable surface-active substances include the protective colloids and emulsifiers commonly used for emulsion polymerization. Preferred emulsifiers are anionic and nonionic emulsifiers, which unlike the protective colloids generally have a molecular weight below 2 000 g/mol and are used in amounts of up to 0.2 to 10% by weight, preferably from 0.5 to 5% by weight, based on the polymer in the dispersion and/or on the monomers M to be polymerized.

The anionic emulsifiers include alkali metal salts and ammonium salts of alkyl sulfates (alkyl: $C_8$–$C_{20}$), of sulfuric monoesters with ethoxylated alkanols (EO units: 2 to 50, alkyl: $C_8$ to $C_{20}$) and with ethoxylated alkylphenols (EO units: 3 to 50, alkyl: $C_4$–$C_{20}$), of alkylsulfonic acids (alkyl: $C_8$ to $C_{20}$) and of alkylarylsulfonic acids (alkyl: $C_4$–$C_{20}$). Further suitable anionic emulsifiers are given in Houben-Weyl, Methoden der organischen Chemie, Volume XIV/1, Makromolekulare Stoffe [Macromolecular substances], Georg-Thieme-Verlag, Stuttgart, 1961, pp. 192–208.

The anionic surface-active substances also include compounds of the formula I

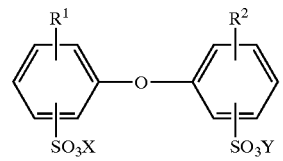

(I)

where $R^1$ and $R^2$ are hydrogen or linear or branched alkyl radicals having from 6 to 18 carbon atoms and in particular having 6, 12 and 16 carbon atoms, $R^1$ and $R^2$ not being both simultaneously hydrogen. X and Y are preferably sodium, potassium or ammonium, sodium being particularly preferred. Use is frequently made of technical mixtures containing a fraction of from 50 to 90% by weight of the monoalkylated product, an example being Dowfax® 2A1 (trademark of Dow Chemical Company). The compounds I are general knowledge, for example, from U.S. Pat. No. 4,269,749.

Suitable nonionic emulsifiers are araliphatic or aliphatic nonionic emulsifiers, examples being ethoxylated mono-, di- and trialkylphenols (EO units: 3 to 50, alkyl: $C_4$–$C_9$), ethoxylates of long-chain alcohols (EO units: 3 to 50, alkyl: $C_8$–$C_{36}$), and also polyethylene oxide/polypropylene oxide block copolymers. Preference is given to ethoxylates of long-chain alkanols (alkyl: $C_{10}$–$C_{22}$, mean degree of ethoxylation: from 3 to 50) and, of these, particular preference to those based on oxo alcohols and naturally occurring alcohols having a linear or branched $C_{12}$–$C_{18}$ alkyl radical and a degree of ethoxylation of from 8 to 50.

It is preferred to use anionic emulsifiers, especially emulsifiers of the formula I, or combinations of at least one anionic and one nonionic emulsifier.

Examples of suitable protective colloids are polyvinyl alcohols, starch derivatives and cellulose derivatives, carboxyl-containing polymers such as homopolymers and copolymers of acrylic acid and/or of methacrylic acid with comonomers such as styrene, olefins or hydroxyalkyl esters, or vinylpyrrolidone homopolymers and copolymers. An exhaustive description of further suitable protective colloids is given in Houben-Weyl, Methoden der organischen Chemie, Volume XIV/1, Makromolekulare Stoffe [Macromolecular substances], Georg-Thieme-Verlag, Stuttgart 1961, pp. 411–420. Mixtures of emulsifiers and/or protective colloids may also be used.

As a result of the preparation process, these surface-active compounds remain within the customary use forms of the finely divided polymers and are therefore also present in the compositions employed in accordance with the invention, where such compositions include a finely divided polymer.

Furthermore, as an additional constituent, the compositions of the invention may comprise polymeric polycarboxylic acid, preferably a homopolymer or copolymer of acrylic acid and/or methacrylic acid.

The polymeric polycarboxylic acids generally comprise polymers synthesized from ethylenically unsaturated monocarboxylic or dicarboxylic acids having preferably from 3 to 8 carbon atoms, and, if desired, comonomers other than such acids. In these polycarboxylic acids, the ethylenically unsaturated carboxylic acids constitute the principal constituent, i.e., they account for more than 40% by weight, preferably more than 50% by weight, and in particular more than 60% by weight, of the monomers from which the polymeric polycarboxylic acid is synthesized.

Preferred ethylenically unsaturated monocarboxylic or dicarboxylic acids are acrylic acid, methacrylic acid, maleic acid and fumaric acid and, with particular preference, acrylic acid and methacrylic acid, and also their mixtures with one another and their mixtures with maleic acid.

Suitable comonomers include the monomers indicated as principal monomers in connection with the finely divided monomers, and also the amides and the $C_1$–$C_4$ hydroxyalkyl esters of the abovementioned ethylenically unsaturated monocarboxylic and dicarboxylic acids; ethylenically unsaturated phosphoric or phosphonic acids, N-vinyl amides and ethylenically unsaturated sulfonic acids (sulfo monomers).

Very particular preference is given to copolymers of acrylic acid with maleic acid, as are described in EP-A 75820, and also to homopolymers of acrylic acid.

Frequently, the polymeric polycarboxylic acids have a number-average molecular weight in the range from 1 000 to 1 million. The K value of these polycarboxylic acids (according to Fikentscher) is generally in the range from 10 to 150 (measured as a 1% strength by weight solution in water).

The polymeric polycarboxylic acids and their preparation are known from the prior art, for example, from DE-A 196 21 573, EP-A 75 820 and DE-A 36 20 149.

In the compositions of the invention, the polymeric polycarboxylic acids may be used where desired in an amount of from 5 to 500% by weight, based on the reaction product of polycarboxylic acid I with ammonia.

Preferably, the polymeric polycarboxylic acids are used together with a compound having at least two hydroxyl groups, e.g., with the hydroxyl-bearing amino compounds of the formula IV and/or with the amines of the formula VI. The weight ratio of polymeric polycarboxylic acid to hydroxyl-containing compound in that case is preferably in the range from 100:1 to 1:1 and in particular in the range from 50:1 to 2:1.

Additionally, the compositions of the invention may comprise the auxiliaries, coloring constituents and finely divided inert fillers that are customary in coating and impregnation technology. Examples of finely divided inert fillers are aluminum silicates, quartz, precipitated or pyrogenic silica, light and heavy spar, talc, dolomite or calcium carbonate; coloring constituents are, in particular, pigments such as titanium white, zinc white, black iron oxide, etc. Examples of auxiliaries are surface-active substances for improving wettability, adhesion promoters, and preservatives.

The use of the above-defined compositions in accordance with the invention makes it possible to produce moldings and consolidated sheetlike structures having excellent mechanical properties and comparatively short cure times. The use of the above-defined compositions in accordance with the invention makes it possible in particular to produce moldings having a high mechanical strength which retain dimensional stability even under humid climatic conditions. Furthermore, the compositions of the invention are suitable as size resins or impregnating resins for papers, especially decorative papers, and also as an adhesive for producing veneers and laminates.

The moldings and sheetlike structures produced using the compositions used in accordance with the invention are formaldehyde-free. Formaldehyde-free denotes the absence, on the basis of the binder used, from the moldings and sheetlike structures of the invention of any substantial amounts of bound or free formaldehyde, with the exception of any natural formaldehyde sources that may possibly be present in the substrate to be bound. In the production of the moldings and sheetlike structures of the invention, therefore, no substantial amounts of formaldehyde beyond the amounts contributed by the substrate are released. In general, the moldings and sheetlike structures contain less than 100 ppm formaldehyde and also do not release to the environment any formaldehyde resulting from the binder.

Moreover, the moldings and sheetlike structures produced by use of the above-defined compositions in accordance with the invention are easy to dispose of or recycle. For this purpose the molding is treated with aqueous alkali, for example, with aqueous solutions of alkali metal hydroxides, especially sodium hydroxide or potassium hydroxide, or alkali metal carbonates. The alkali solutions contain, for example, from 5 to 50% by weight, in particular from 10 to 30% by weight, of alkali. In general, spraying or impregnating the molding with the aqueous alkali is sufficient, preferably at an elevated temperature, e.g., at temperatures in the range from 30 to 100° C. The liquors thus obtained may be passed to a biological treatment facility, since the organic constituents they contain are at least 60% biodegradable.

To produce moldings by use of the above-defined composition in accordance with the invention, a finely divided material—substrate hereinbelow—is impregnated or mixed with an above-defined composition and the resulting mixture is subjected to a shaping process at temperatures above 120° C.

By finely divided substrates are meant, in particular, fibrous or particulate substrate materials, the particulate materials typically having average dimensions in the range from 0.01 to 2 cm and the fiberlike materials typically having average fiber lengths from 0.1 to 10 cm. Examples of particulate substrate materials are natural organic materials such as wood chips and wood slivers and also cork chips and inorganic materials such as sand. Examples of fiberlike materials are natural fibers such as wood fibers, jute fibers, flax fibers, hemp fibers, coconut fibers, cotton fibers, cellulose fibers, wool, stinging nettle fibers or sisal fibers, and also synthetic fiber materials such as synthetic fibers based on fiber-forming organic polymers, glass fibers and mineral fibers.

Conducting the shaping process at temperatures above 120° C. leads to the solidification of the mixture of the composition of the invention and the finely divided material to form a molding. It is assumed that the solidification is brought about by the conversion of the composition used into the above-described water-insoluble polymers containing cyclic imide structures, e.g., structural units of the formula III, with additional solidification being effected by means of the compounds that may be used containing at least two OH groups. This can probably be attributed to crosslinking reactions between the polymers formed. It is supposed that the finely divided polymers, where used, bring about flexibilization and additional hydrophobicization of the moldings obtainable by the process of the invention.

Prior to application, the compositions employed in accordance with the invention are in the form of monomolecular compounds or low molecular mass oligomers. On heating, therefore, they form highly mobile melts or low-viscosity solutions, leading to particularly good distribution of binder in the finely divided substrates to be consolidated.

The temperatures required to produce the molding are preferably at least 130° C., in particular at least 140° C., with particular preference above 150° C., and with very particular preference above 160° C., and will generally not exceed 350° C. They are preferably in the range from 130° C. to 300° C., in particular from 140° C. to 280° C., with particular preference from 140° C. to 250° C. and, with very particular preference, from 160° C. to 230° C. The temperature in each case is also guided by the chosen substrate; the extent of curing may also be controlled by way of the curing time, which depending on temperature may be in the range from a few minutes, e.g., 1 minute, to several hours, e.g., up to 3 hours.

The consolidation of the finely divided substrate may take place either in one or else in two or more stages. In a first step, for example, the curing temperature and time may be chosen that, initially, only uniform distribution of the liquid-melt constituents of the composition in the finely divided substrate is achieved, and subsequently, by an increase in temperature, substantially complete consolidation takes place in a second or subsequent step. This subsequent step may take place in spatial and temporal separation from the first step. By this means, for example, it becomes possible to use the compositions of the invention to produce semifinished goods which are impregnated with binder and can then be shaped and consolidated at another location.

The shaping process is of course guided by the nature and geometry of the molding that is to be produced. Shaping generally takes place by application of increased pressure, e.g., generally from 2 to 1 000 bar, preferably from 10 to 750 bar, with particular preference from 200 to 500 bar.

To produce the moldings, the above-defined composition will generally be used in an amount of from 1 to 100% by weight, in particular from 2 to 50% by weight, with particular preference from 5 to 40% by weight, based on the finely divided substrate.

The mixing or impregnation of the finely divided substrate with the compositions employed in accordance with the invention may be carried out in a customary manner. Pulverulent compositions, for example, may be scattered on, scattered in, or shaken into the substrate material, which may have been mechanically preconsolidated, or may be mixed directly with the fiber material. For example, the substrate material may be spread out and, if desired, compacted. Prior to the application of the pulverulent composition by scattering, the substrate may also be moistened with water. The finely divided substrate may also be coated with a flowable form of the above-defined composition, such as an aqueous solution, or may be mixed with the pulverulent binder.

The mixture of fibers, chips and/or slivers and the above-defined composition may be dried initially at temperatures, for example, of from 30 to 120° C. and then compressed to give the moldings at the abovementioned temperatures.

The process of the invention is preferably suitable for producing sheets and contoured parts. Their thickness is generally at least 1 mm, preferably at least 2 mm. Particularly suitable are wood fiberboards and chipboards, cork boards, cork blocks and cork molds, insulant boards and insulant rolls made, for example, from natural, mineral and glass fibers, for automotive interior parts, such as interior door trim panels, dashboards, and parcel shelves and the like.

The process of the invention is especially suitable for producing woodbase materials such as wood chipboard and wood fiberboard. The production of such moldings by the gluing of comminuted wood is known in principle (cf. Ullmanns Encyclopädie der technischen Chemie, 4th edition, 1976, Volume 12, pp. 709–727, and H. J. Deppe, K. Ernst Taschenbuch der Spanplattentechnik, 2nd edition, Verlag Leinfelden 1982).

It is preferred to use chips whose average size is from 0.1 to 4 mm, in particular from 0.2 to 2 mm, and which contain less than 6% by weight of water. It is also possible, however, to use much coarser chips, and those with a higher moisture content. The binder is applied with great uniformity to the woodchips, the binder:woodchip weight ratio being preferably from 0.02:1 to 0.4:1. The glued woodchips are then spread out into a layer with an extremely uniform surface, the thickness of the layer being guided by the desired thickness of the finished chipboard. At a temperature of, for example, from 180° C. to 230° C., the scattered layer is compressed to a board by applying pressures of usually from 10 to 750 bar. The necessary press times may vary within a wide range and are generally from 15 seconds to 30 minutes.

The wood fibers of appropriate quality needed to produce medium density fiberboard (MDF) panels may be produced from barkless woodchips by milling in special mills or refiners at temperatures of approximately 180° C.

For gluing, the wood fibers are generally swirled up in a stream of air and the heat-curable composition is introduced through nozzles into the resultant fiber stream (blow-line process). The ratio of wood fibers to binders, based on the dry-matter content or solids content of the composition, is usually from 40:1 to 2:1, preferably from 20:1 to 4:1. In the fiber stream, the glued fibers are dried at elevated temperatures, spread out to form a fiber web, and compressed at pressures of from 10 to 750 bar to form boards or moldings.

Alternatively, as described in DE-A 2417243, the glued wood fibers may be processed to a transportable fiber mat. This intermediate can be processed further to boards or parts, such as door interior trim panels of motor vehicles, for example, in a second, temporally and spatially separate step.

Similarly, parts made of cork may also be produced. Suitable finely divided cork substrates include both ground cork with particle sizes <2 mm and coarse cork with particle sizes in the range from 1 to 20 mm, preferably from 1 to 10 mm. Regarding the amount of binders and the processing temperatures, the comments made above apply.

Other natural fiber substances as well, such as sisal, jute, hemp, flax, coconut fibers and/or banana fibers, may of course be processed to boards and parts with the binders of the invention. The natural fiber materials may also be used in mixtures with plastic fibers, e.g., polypropylene, polyethylene, polyesters, polyamides or polyacrylonitrile. These plastic fibers may also function as cobinders alongside the binder of the invention. The fraction of the plastic fibers is preferably less than 50% by weight, in particular less than 30% by weight, and with very particular preference less than 10% by weight, based on all slivers, chips or fibers.

The compositions defined above are, moreover, suitable as formaldehyde-free binders for mineral substrates such as sand. Moldings comprising mineral substrates, especially sand, are used for example as casting molds and cores for metal casting, and also as mold insulating boards (E. Flemming, W. Tilch, Formstoffe and Formverfahren, Dt. Verlag für Grundstoffindustrie, Stuttgart, 1993).

The production of the moldings comprising mineral substrates takes place in the manner described above, by mixing of a substrate with the above-defined compositions in the customary apparatus for such purposes, and then curing the system at the temperatures indicated above, preferably in the range from 160 to 230° C. The composition (calculated as reaction product of polycarboxylic acid I with ammonia) is used preferably in an amount of from 2 to 50% by weight, based on the mineral substrate. Preferred for this purpose are compositions containing at least one of the aforementioned compounds containing at least two hydroxyl groups, preferably in an amount of from 20 to 50 parts by weight (PBW), based on 100 parts by weight of reaction product.

The compositions of the invention may also be used for consolidating sheetlike structures of fiber materials. In this case the compositions of the invention in the fully cured state, i.e., after heating to the abovementioned temperatures, act as binders for the fibers. Preference is given to glass fiber webs. The unbonded fiber webs (untreated fiber webs), especially of glass fibers, are bound, i.e., consolidated, by the fully cured compositions of the invention.

Examples of sheetlike structures of fiber materials are, besides wovens, especially fiber webs and fiber mats. Fiber webs that may be mentioned include webs of the aforementioned fiber materials, especially webs of cellulose, cellulose acetate, esters and ethers of cellulose, cotton, hemp, animal fibers, such as wool or hair, and especially webs of synthetic or inorganic fibers, examples being aramid, carbon, polyacrylonitrile, polyester, mineral, PVC or glass fibers.

In the case of use as binders for fiber webs, the compositions of the invention may include, for example, the following additives: silicates, silicones, boron compounds, lubricants, wetting agents.

To consolidate the fiber structure, the composition used in accordance with the invention is applied, preferably in a fiber/binder weight ratio of 10:1 to 1:1, with particular preference from 6:1 to 3:1, to the untreated fiber web in the manner customary for the purpose, for example, by impregnating, padding, brushing or printing or, in the case of the powder, by being blown in together with the fiber material.

Incorporation of the composition into the untreated fiber web is generally followed by consolidation of the binder composition at preferably from 120 to 350° C., in particular from 130 to 280° C., with very particular preference from 140 to 230° C., over a period of preferably from 10 seconds to 10 minutes, in particular from 10 seconds to 3 minutes.

The bonded fiber web obtained has high strength in the dry and wet states. In particular, the binders of the invention permit short drying times and also low drying temperatures. The bonded fiber webs, especially glass fiber webs, are suitable for use as or in roofing membranes, as base materials for wallpapers, or as inliners or base material for floor coverings made, for example, from PVC.

Further examples of sheetlike structures of fiber materials are the fiber mats commonly used as insulating materials, which depending on their use are constructed from inorganic fibers, such as mineral fibers and glass fibers (heat insulating mats), or from the abovementioned natural fibers.

Insulating materials of organic fibers are produced industrially by spinning melts of the corresponding mineral raw materials; see U.S. Pat. Nos. 2,550,465, 2,604,427, 2,830, 648, EP-A-354 913 and EP-A-567 480. The composition is then incorporated into the freshly produced, still-hot inorganic fibers. The composition remains, in substantially uncured form, adhering as a viscous mass on the fibers. A continuous, binder-containing fiber mat produced in this way is transported on by means of appropriate conveyor belts through a curing oven. In the oven, the mat cures at temperatures in the range from about 100 to 200° C. to form a rigid matrix. After curing, the mats of insulating material are processed appropriately.

The predominant fraction of the inorganic fibers used in the insulating materials has a diameter in the range from 0.5 to 20 $\mu$m and a length in the range from 0.5 to 10 cm.

In addition, the composition of the invention may be used to produce coating and impregnating materials for boards made of orgainc and/or inorganic fibers, nonfibrous mineral fillers, and also starch and/or aqueous polymer dispersions. Coating and impregnating materials based on the compositions defined above give the boards a high flexural modulus. The production of such boards is known in principle.

Boards of this kind are commonly used as soundproofing panels. The thickness of the panels is usually in the range from about 5 to 30 mm, preferably in the range from 10 to 25 mm. The edge length of the square or rectangular panels is usually in the range from 200 to 2 000 mm.

The components of the composition of the invention are present in the coating material in an amount, generally, of from 1 to 65% by weight. The fraction of the inert fillers is generally from 0 to 85% by weight. The water content of the coating material is generally at least 10% by weight.

The coating materials are employed in a customary manner by application to a substrate, by spraying, rolling, flow coating or impregnating, for example. The amounts applied, based on the dry-matter content of the composition, are generally from 2 to 100 g/m$^2$. Coating is completed, after drying beforehand if desired, by curing at the temperatures stated above.

The amounts of additives to be used are known to the skilled worker and are guided in each individual case by the desired properties and by the target application.

The nonlimiting examples below illustrate the invention.
I Testing as Binders for Wood Fibers

EXAMPLES 1 TO 7 x g of wood fibers (thermomechanically adjusted sprucewood, average fiber length about 3 mm, residual moisture content 7%) were beaten in a plastic container. y g of binder (calculated as solids) in the form of an aqueous binder solution with a concentration of approximately 40% by weight were added by means of a spray gun. The fibers thus glued were dried at 60° C. to a residual moisture content of about 7%. 180 g of this mixture were introduced into a wood mold (30×30 cm), compressed with a wooden board, demolded and compressed between two metal plates with 2 mm spacers, using a hydraulic press, with a pressing temperature of 220° C. for 120 seconds. For this purpose, a press pressure of 50 bar was set first of all for 20 seconds. Then, after a pressure release phase lasting 10 seconds, a pressure of 200 bar was maintained for 90 seconds.

Wood fiberboard panels were produced analogously using pulverulent compositions. For this purpose, x g of the above-described wood fibers were mixed thoroughly with y g of powder in a plastic bag and the mixture was compressed to boards in the manner described above.

The compositions tested were as follows:

ZV1 self-crosslinking polyvinyl acetate powder, Vinnex LL 572 from Wacker Chemie, Burghausen (comparative)

ZV2 maleic anhydride (comparative)

Z1 maleamide as powder

Z2 maleic anhydride and ammonium carbonate in a weight ratio of 1:1, as a powder Z3 ammonium maleate as a 40% by weight solution Z4 ammonium maleate+triethanolamine in a weight ratio of 1:1, as an aqueous solution The fiberboard panels obtained were stored for 24 h and, respectively, 7 days in a control-climate cabinet at 80° C. and 90% relatively atmospheric humidity in order to determine the mechanical properties. The samples were subsequently assessed for their strength, using a scale of ratings from 1 to 6, 1 being the best and 6 the worst assessment. Also determined were the thickness swelling (in % based on the original thickness) and the bowing of the panels. To determine the bowing of the panels, sample specimens measuring 5 cm×30 cm were fixed to a horizontal support with a supporting width of 23 cm. The bowing, relative to the horizontal, was measured after 24 h, and, respectively, 7 days in a controlled-climate cabinet at 80° C. and 90% relative atmospheric humidity.

Thickness swelling and water absorption on storage for 2 h and, respectively, 24 h in demineralized water in analogy to DIN 52351 were also determined. The water absorption corresponds to the weight increase in %, based on the original weight. The thickness swelling is supported as the relative increase in thickness of 2×2 cm sample specimens. Moreover, the flexural strength and the elasticity modulus of the panels were determined in the bending test in accordance with DIN EN 310 at 23° C. and 120° C. The data are compiled in Table 1.

$N/mm^2$, 30 sec; 2. removal of pressure, 3 sec; 3. pressing pressure 1.5 $N/mm^2$, 27 sec.

Z3 ammonium maleate as a 40% strength by weight aqueous solution

Z5 ammonium maleate+triethanolamine in a weight ratio of 5:1, in aqueous solution Z6 ammonium maleate+polymer P1[1]) in a weight ratio of 3:1, in aqueous solution Z7 ammonium maleate+Styrofan (BASF)+triethanolamine in a weight ratio of 5:1.33:1, in aqueous solution 1) Polymer P1 is finely divided polymer based on styrene/butadiene in the form of a commercially customary aqueous polymer dispersion having a

TABLE 1

| Example | C1 | C2 | 1 | 2 | 3 | 4 | 5 | 6 | 7 |
|---|---|---|---|---|---|---|---|---|---|
| Composition | ZV1 | ZV2* | Z1 | Z1 | Z1 | Z2 | Z3 | Z3 | Z4 |
| Wood fibers [g] | 170 | 160 | 180 | 170 | 160 | 180 | 180 | 160 | 180 |
| Binder composition [g][1] | 30 | 40 | 20 | 30 | 40 | 20 | 20 | 40 | 25 |
| Testing in the controlled-climate cabinet | | | | | | | | | |
| Strength 24 h | — | 3 | 3 | — | 2 | 3 | — | 2 | 3 |
| Strength 7 d | — | 5 | 3 | — | 3 | 4 | — | 3 | 3 |
| Bowing 24 h [mm] | — | 50 | 16 | — | 20 | 29 | — | 9 | 20 |
| Bowing 7 d [mm] | — | >60 | 32 | — | 55 | 40 | — | 31 | 35 |
| Thickness swelling 7 d [%] | — | 28 | 25 | — | 26 | 27 | — | 19 | 21 |
| Water storage | | | | | | | | | |
| Water absorption 2 h [%] | 154 | 45 | 46 | 59 | 40 | 66 | 40 | 38 | 49 |
| Water absorption 24 h [%] | 176 | 54 | 54 | 67 | 46 | 75 | 47 | 48 | 64 |
| Thickness swelling 2 h [%] | 113 | 19 | 30 | 28 | 21 | 61 | 18 | 16 | 28 |
| Thickness swelling 24 h [%] | 126 | 22 | 33 | 31 | 23 | 66 | 21 | 18 | 33 |
| Bending test: | | | | | | | | | |
| Flexural strength 23° C. [$N/mm^2$] | 30.5 | 19 | —** | 42.8 | 43.2 | 29.6 | 39.4 | 40.8 | 37.8 |
| Flexural strength 120° C. [$N/mm^2$] | 11 | 17.2 | 31.9 | 31 | 23.2 | 29.9 | 33.9 | 28.5 | 26.5 |
| Elasticity modulus 23° C. [$N/mm^2$] | 3050 | 3934 | —** | 4645 | 5416 | 3539 | 4340 | 5296 | 4023 |
| Elasticity modulus 120° C. [$N/mm^2$] | 1112 | 3096 | 3387 | 3424 | 3225 | 3297 | 4430 | 3896 | 3323 |

[1])calculated as solids;
*when the press was opened, an irritant smoke was released
**values were not determined.

The fiberboard panel produced in Example 1 was treated with 10% strength by weight aqueous sodium hydroxide solution at 50° C. for 1.5 h. The sample specimen fell almost completely apart, and the wood fibers were recovered by filtration. The aqueous binder solution obtained (liquor) can be supplied to a treatment plant, because the organic ingredients of this solution are at least 60% biodegradable. In this way, uncomplicated recycling or disposal of the wood fiberboard panels is possible.

II. Testing as Binders for Natural Fiber Mats

EXAMPLES 8 TO 11

The compositions indicated below were diluted with water to a solids content of approximately 35% by weight. Jute/sisal mats with a thickness of about 1 cm and a basis weight of 1 200 g/m² (manufactured by Braunschweiger Jute- und Flachs-Industriebetriebe GmbH) were impregnated with the 35% strength binder liquor, using a padder roll, in such a way as to apply about 30 parts by weight of binder nonvolatiles based on 70 parts by weight of dry fiber (see Table 1). The impregnated fiber mat (35×30 cm) were dried at 65° C. in a circulating-air drying cabinet to a residual moisture content of about 5%, based on the total weight of the mat, and were compressed with a hydraulic press at a pressing temperature of 200° C. in accordance with the following pressing cycle: 1. pressing pressure 0.75 solids content of about 53% by weight and a glass transition temperature of about 105° C.

The water absorption WA and the thickness swelling TS of samples stored in water, and also the flexural strength FS and the elasticity modulus, were determined as described under I. The results are compiled in Table 2.

TABLE 2

| Example | 8 | 9 | 10 | 11 |
|---|---|---|---|---|
| Binder | Z3 | Z5 | Z6 | Z7 |
| Fiber/binder weight ratio | 7:3 | 7:3.6 | 7:3 | 7:3.45 |
| Panel thickness [mm] | 1.71 | 1.87 | 1.71 | 1.87 |
| Density [g/cm³] | 0.72 | 0.75 | 0.80 | 0.76 |
| WA 2 h [%] | 52 | 65 | 36 | 58 |
| WA 24 h [%] | 54 | 69 | 41 | 62 |
| TS 2 h [%] | 52 | 77 | 31 | 57 |
| TS 24 h [%] | 57 | 80 | 35 | 60 |
| FS 23° C. [$N/mm^2$] | 34.2 | 25.1 | 27.9 | 34.4 |
| FS 60° C. [$N/mm^2$] | 21.8 | 18.8 | 31.8 | 21.7 |
| FS 120° C. [$N/mm^2$] | 19.6 | 14.8 | 15.1 | 7.6 |
| Elasticity modulus 23° C. [$N/mm^2$] | 6467 | 5253 | 3593 | 5396 |

TABLE 2-continued

| Example | 8 | 9 | 10 | 11 |
|---|---|---|---|---|
| Elasticity modulus 60° C. [N/mm$^2$] | 4543 | 3718 | 4975 | 3690 |
| Elasticity modulus 120° C, [N/mm$^2$] | 4543 | 3700 | 3707 | 1342 |

III. Testing as Binders for Cork Granules

EXAMPLES 12 TO 19

Dried cork granules (cleaned and ground cork, bulk density 60 g/l, average particle size 5 mm) and the binder compositions indicated below were mixed thoroughly in the weight ratios indicated in Table 3 (calculated in each case as solids) in a Kenwood laboratory mixer (about 2 minutes of stirring following the addition of binder). The binder-treated cork particles were dried (drying cabinet, 50° C). 140 g of the dried cork particles were introduced into a two-part metal mold with internal dimensions 12.5×12.5×3 cm and subjected to initial compaction. The bottom and die of the mold were perforated with vent holes to take off the water vapor that was released. The metal mold was held in a press, preheated to 130° C., at a pressure of 50 bar (0.75 N/mm$^2$) for 2 h.

The result was a cork block having a thickness of about 3 cm. The thickness swelling and water absorption tests were conducted on sample specimens measuring 5×5×3.3 cm which had been stored in water. The results are given in Table 3.

Zv1 self-crosslinking polyvinyl acetate powder, Vinnex LL 572 from Wacker Chemie, Burghausen (comparative)

Z1 maleamide as powder

Z2 maleic anhydride and ammonium carbonate in a weight ratio of 1:1, as a powder Z3 ammonium maleate as a 40% strength by weight solution

TABLE 3

| Example | V3 | V4 | 12 | 13 | 14 |
|---|---|---|---|---|---|
| Binder | ZV1 | ZV1 | Z1 | Z1 | Z1 |
| Weight ratio cork/binder | 92.5:7.5 | 90:10 | 92.5:7.5 | 90:10 | 80:20 |
| Density [g/cm$^3$] | n.m. | n.m. | 0.27 | 0.27 | 0.28 |
| Water absorption 2 h [%] | n.m. | n.m. | 46.9 | 47.3 | 36.4 |
| Water absorption 24 h [%] | n.m. | n.m. | 101.5 | 77.6 | 85.3 |
| Thickness swelling 2 h [%] | n.m. | n.m. | 4.4 | 5.2 | 5.1 |
| Thickness swelling 2 h [%] | n.m. | n.m. | 16.5 | 17.7 | 12.7 |

| Example | 15 | 16 | 17 | 18 | 19 |
|---|---|---|---|---|---|
| Binder | Z2 | Z2 | Z3 | Z3 | Z3 |
| Weight ratio cork/binder | 92.5:7.5 | 90:10 | 92.5:7.5 | 90:10 | 80:20 |
| Density [g/cm$^3$] | 0.29 | 0.29 | 0.27 | 0.27 | 0.26 |
| Water absorption 2 h [%] | 48.0 | 53.8 | 39.6 | 42.1 | 38.1 |
| Water absorption 24 h [%] | 95.6 | 114.8 | 87.0 | 80.9 | 84.0 |
| Thickness swelling 2 h [%] | 11.3 | 5.9 | 2.3 | 3.2 | 2.0 |
| Thickness swelling 2 h [%] | 24.2 | 16.5 | 4.3 | 6.6 | 3.3 | n.m. = not measured

IV. Testing as Binders for Finely Divided Mineral Materials

EXAMPLES M1 TO M27

600 g of quartz sand F34 were mixed with the ingredients specified in Tables 4 to 7. Aqueous solutions were incorporated in a Kenwood laboratory mixer. Powders were incorporated by introducing the constituents into a plastic bag and carefully shaking them. The wet mixtures were shaped and compacted in a metal mold to give test specimens (Fischer bars) measuring 17×2.3×2.3 cm and, after demolding, were cured in a convection oven at the temperature stated in the tables for 2 h. Compaction is carried out using a ram of type PRA from Georg Fischer AG.

The bending strength of the Fischer bars thus produced was determined immediately following removal from the oven, in the dry state at 23° C., and in the wet state following one hour of storage in demineralized water at 23° C., using a type PFG strength testing apparatus with the test device PBV (from Georg Fischer, Schaffhausen/CH). The results are set out in Tables 4 to 6. Additionally, the water absorption of the Fischer bars was measured after storage in water for one hour.

TABLE 4

Variation of temperature, binder amount and binder type

| Experiment | Ingredient[1] | [g] | T [° C.][2] | FS 23° C. [N/cm$^2$][4] | FS, hot [N/cm$^2$][5] |
|---|---|---|---|---|---|
| VM1 (comparative) | MAn | 60 | 200 | n.m.[3] | n.m. |
| M1 | mMA | 30 | 130 | 70 | 30 |
| M2 | mMA | 30 | 150 | 130 | 30 |
| M3 | mMA | 30 | 170 | 135 | 70 |
| M4 | mMA | 30 | 200 | 140 | 70 |
| M5 | mMA | 60 | 170 | 200 | 150 |
| M6 | mMA | 90 | 170 | 115 | 90 |
| M7 | mMA | 60 | 200 | 120 | 80 |
| M8 | mMA | 90 | 200 | 90 | 70 |
| M9 | MAn + (NH$_4$)$_2$CO$_3$ | 19.8 10.2 | 200 | 20 | 20 |
| M10 | MAn + (NH$_4$)$_2$CO$_3$ | 39.6 20.4 | 200 | 40 | 40 |
| M11 | MAn + (NH$_4$)$_2$CO$_3$ | 59.4 30.6 | 200 | 60 | 50 |
| M12 | Malic acid + (NH$_4$)$_2$CO$_3$ + triethanolamine | 44.4 7.8 6.0 | 200 | 1020 | 750 |
| M13 | Malic acid + (NH$_4$)$_2$CO$_3$ + triethanolamine | 88.8 15.6 12.0 | 200 | >1200 | >1300 |
| VM2 (comparative) | Citric acid + triethanolamine | 120 12.0 | 200 | n.m. | n.m. |
| M14 | Citric acid + (NH$_4$)$_2$CO$_3$ + triethanolamine | 48.0 6.0 6.0 | 200 | 1050 | 680 |
| M15 | Citric acid + (NH$_4$)$_2$CO$_3$ + triethanolamine | 96.0 12.0 12.0 | 200 | >1300 | >1300 |
| M16 | mMA + triethanolamine | 23.0 7.0 | 170 | 635 | 650 |

[1]MAn = maleic anhydride; mMA = monomaleamide
[2]Oven temperature
[3]n.m.: value not measurable since sample specimens fall apart
[4]Flexural strength at 23° C.
[5]Flexural strength in the hot state following removal from the oven

TABLE 5

| Experiment | Binder(s)[1] | [g] | T[2] [° C.] | WA[3] [%] | FS$_{wet}$[4] [N/cm$^2$] | FS$_{dry}$[5] [N/cm$^2$] |
|---|---|---|---|---|---|---|
| M17 | Z6 | 69.1 | 170 | 23.7 23.6 | 730 710 | 1170 |
| M18 | Z5 | 72.6 | 170 | 23.3 23.4 | 390 370 | 380 |
| M19 | Z7 | 66.1 | 170 | 23.7 23.8 | 480 680 | 1300 |
| M20 | Z8 | 63.5 | 170 | 23.5 23.8 | 740 760 | 1240 |
| M21 | Z9 | 61.2 | 170 | 23.5 23.7 | 580 640 | 1290 |

TABLE 5-continued

| Experiment | Binder(s) [1] [g] | T [2] [° C.] | WA [3] [%] | FS$_{wet}$ [4] [N/cm$^2$] | FS$_{dry}$ [5] [N/cm$^2$] |
|---|---|---|---|---|---|
| M22 | Z6 | 69.1 | 200 | 24.1 | 1040 | 1200 |
|  |  |  |  | 23.8 | 970 |  |
| M23 | Z5 | 72.6 | 200 | 25.4 | 850 | 900 |
|  |  |  |  | 25.2 | 880 |  |
| M24 | Z7 | 66.1 | 200 | 12.8 | 1160 | 1300 |
|  |  |  |  | 19.2 | 1100 |  |
| M25 | Z8 | 63.5 | 200 | 16.5 | 1160 | 1300 |
|  |  |  |  | 11.6 | 1200 |  |
| M26 | Z9 | 61.2 | 200 | 23.0 | 980 | 1290 |
|  |  |  |  | 23.0 | 1000 |  |
| M27 | Z6 | 69.1 | 150 | 25.8 | 220 | 460 |
|  |  |  |  | 25.6 | 230 |  |

[1] Z5 ammonium maleate + triethanolamine in a weight ratio of 5:1, as an aqueous solution
Z6 ammonium maleate + triethanolamine in a weight ratio of 10:1, as an aqueous solution
Z7 ammonium maleate + triethanolamine in a weight ratio of 10:3, as an aqueous solution
Z8 ammonium maleate + triethanolamine in a weight ratio of 2.5:1, as an aqueous solution
Z9 ammonium maleate + triethanolamine in a weight ratio of 2:1, as an aqueous solution
[2] Oven temperature
[3] Water absorption after 60 minutes
[4] Flexural strength in the wet state (dual determination)
[5] Flexural strength in the dry state at 23° C.

Additionally, the following oligomeric binders Z10 to Z14 were prepared and tested as binders for quartz sand:

Preparation of Z10:
In a glass flask, monomaleamide was melted using a 150° C. oil bath until an exothermic reaction began (evident from a spontaneous orange coloration). The flask was cooled in liquid nitrogen and broken and the contents of the flask were taken up in water. The result was a 50% strength by weight aqueous solution of the binder.

Preparation of Z11:
The preparation took place in a similar way to that of Z12, but the monomaleamide was allowed to react at 150° C. for a further 30 minutes. This gave a 50% strength by weight aqueous solution of the binder.

Preparation of Z12:
In a glass flask, a mixture of monomaleamide and triethanolamine in a weight ratio of 5:1 was melted using a 150° C. oil bath until an exothermic reaction began (see above). The flask was cooled in liquid nitrogen and broken and the contents of the flask were taken up in water. The result was a 50% strength by weight aqueous solution of the binder.

Preparation of Z13:
In a glass flask, 5 parts by weight of monomaleamide were melted using a 150° C. oil bath until an exothermic reaction began (see above). Then 1 part by weight of triethanolamine was added, the flask was quenched in liquid nitrogen and broken and the contents of the flask were taken up in water. The result was a 50% strength by weight aqueous solution of the binder.

Preparation of Z14:
The preparation took place in a similar way to that of Z13, but the monomaleamide was allowed to react at 150° C. initially for 30 minutes before the addition of the triethanolamine. This gave a 50% strength by weight aqueous solution of the binder.

The binders Z10 to Z14 were mixed with 450 g of quartz sand F34 in the proportions indicated in Table 6, and the mixtures were processed to give Fischer bars. The properties of the resultant bars are likewise indicated in Table 6. The measurement methods correspond to the methods stated under IV.

TABLE 6

| Experiment | Binder(s) [1] [g] | T [2] [° C.] | WA [3] [%] | FS$_{wet}$ [4] [N/cm$^2$] | FS$_{dry}$ [5] [N/cm$^2$] |
|---|---|---|---|---|---|
| M28 | Z10 | 90 | 200 | n.m. | n.m.[6] | 90 |
| M29 | Z12 | 90 | 200 | 21.5 | 110 | 560 |
| M30 | Z10 + Z13 | 30 450 | 200 | 15.1 | 640 | 810 |
| M31 | Z11 + Z14 | 72.6 450 | 170 | 11.8 | 990 | 1190 |

[1] For binder type see preparation examples
[2] Oven temperature
[3] Water absorption after 60 minutes
[4] Flexural strength in the wet state (dual determination)
[5] Flexural strength in the dry state at 23° C.
[6] n.m. = not measurable

We claim:
1. a method for producing (1) moldings from finely divided materials, wherein the finely divided material is mixed or impregnated with a heat-curable composition and the resultant mixture is shaped at temperatures above 120° C. or (2) consolidated sheetlike structures of fiber materials, wherein an unconsolidated sheetlike structure of fiber materials is first treated with a heat-curable composition and then heated at temperatures above 120° C., wherein the heat curable composition comprises:
   (A) at least one reaction product of
      i. at least one polycarboxylic acid of the formula I:

$$\begin{array}{c} R \\ | \\ X-C-COOH \\ | \\ Y-CH-COOH \end{array} \quad (I)$$

in which
   R is a hydrogen or a CH$_2$COOH group,
   X is hydrogen, OH or NH$_2$, but is OH or NH$_2$ if Y is hydrogen,
   Y is hydrogen, OH or NH$_2$ but is OH or NH$_2$ is X is hydrogen, or
   X and Y together area π bond, and/or an anhydride of the polycarboxylic acid I
      ii. with ammonia and, if desired,
      iii. with primary amines and/or compounds containing at least two hydroxyl groups; and/or
   (B) a mixture of at least one polycarboxylic acid of the formula I and/or its anhydride and at least one substance which releases ammonia on heating and, if desired, primary amines and/or compounds containing at least two hydroxyl groups.

2. The method as claimed in claim 1, wherein the reaction product of the components i and ii is selected from the monoamides and diamides, the monoammonium and diammonium salts, and the monoamide ammonium salts of maleic acid and of fumaric acid.

3. The method as claimed in claim 1, wherein the reaction product is a water-soluble oligomer obtained by heating a monoamide or diamide, a monoammonium or diammonium salt or a monoamide ammonium salt of a polycarboxylic acid of the formula I.

4. The method as claimed in claim 1, wherein the heat-curable composition further comprises a finely divided polymer of ethylenically unsaturated monomers.

5. The method as claimed in claim 1, wherein the heat-curable composition further comprises at least one compound containing at least two hydroxyl groups.

6. The method as claimed in claim 1, wherein the binder is used in an amount of from 2% by weight to 100% by weight, based on 100% by weight of finely divided material.

7. The method as claimed in claim 1, wherein the heat-curable composition is used as a powder.

8. The method as claimed in claim 1, wherein the finely divided material is used in the form of fibers, chips, slivers or particulate materials.

9. The method as claimed in claim 1, wherein the composition is used in the form of an aqueous solution or dispersion.

10. A molding obtainable by a process as claimed in claim 1.

11. A sheetlike structure obtainable by a method as claimed in claim 1.

12. A heat-curable composition comprising (A) at least one reaction product of
   i. at least one polycarboxylic acid of the formula I:

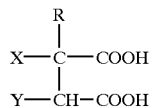
(I)

in which

R is hydrogen or a $CH_2COOH$ group,

X is hydrogen, OH or $NH_2$, but is OH or $NH_2$ if Y is hydrogen,

Y is hydrogen, OH or $NH_2$ but is OH or $NH_2$ is X is hydrogen, or

X and Y together are a $\pi$ bond, and/or an anhydride of the polycarboxylic acid I ii. with ammonia and, if desired, iii. with primary amines and/or compounds containing at least two hydroxyl groups; and/or (B) a mixture of at least one polycarboxylic acid of the formula I and/or its anhydride and at least one substance which releases ammonia on heating and, if desired, primary amines and/or compounds containing at least two hydroxyl groups; and (C) at least one further constituent selected from finely divided polymers of ethylenically unsaturated monomers, compounds containing at least two hydroxyl groups, and polymeric polycarboxylic acids.

* * * * *